(12) United States Patent
Van Every et al.

(10) Patent No.: US 7,380,453 B1
(45) Date of Patent: Jun. 3, 2008

(54) UNDERSEA DATA LOGGING DEVICE WITH AUTOMATED DATA TRANSMISSION

(75) Inventors: Eric Van Every, Lansing, NY (US); Eric A Johnson, Greene, NY (US)

(73) Assignee: Advanced Design Consulting USA, Inc, Lansing, NY (US)

( * ) Notice: Subject to any disclaimer, the term of this patent is extended or adjusted under 35 U.S.C. 154(b) by 0 days.

(21) Appl. No.: 11/532,518

(22) Filed: Sep. 16, 2006

(51) Int. Cl.
*G01C 5/00* (2006.01)
(52) U.S. Cl. .......................... 73/170.29; 367/7
(58) Field of Classification Search ..............................
73/170.29–170.34; 367/6
See application file for complete search history.

(56) References Cited

U.S. PATENT DOCUMENTS

| | | |
|---|---|---|
| 3,968,954 A | 7/1976 | Casco |
| 4,410,282 A | 10/1983 | Leger |
| 4,953,986 A | 9/1990 | Olson |
| 5,209,112 A | 5/1993 | McCoy |
| 5,331,602 A | 7/1994 | McLaren |
| 6,163,503 A | 12/2000 | Gudbjornsson |
| 6,941,226 B2 | 9/2005 | Estep |

*Primary Examiner*—Andre J Allen
(74) *Attorney, Agent, or Firm*—Leo B. Kriksunov

(57) ABSTRACT

An undersea logging device has a pressure sensor and at least one environmental parameter sensor. The data measured by the sensors is logged and is wirelessly transmitted when a preset value of pressure is detected by the pressure sensor.

20 Claims, 5 Drawing Sheets

UNDERSEA DATA LOGGING DEVICE WITH AUTOMATED DATA TRANSMISSION

FEDERALLY SPONSORED RESEARCH OR DEVELOPMENT

The U.S. Government may have certain rights in this invention pursuant to funding, at least in part, by a Grant No. DG133R04CN0121 awarded by the U.S. Department of Commerce, National Oceanic and Atmospheric Administration.

TECHNICAL FIELD

This invention relates to methods and devices to remotely monitor physical and chemical parameters of the environment, and to monitoring, recording and the periodic reporting of underwater environmental parameters via automatic data transfer.

BACKGROUND

Monitoring of the environmental parameters of the sea is important for various meteorological, oceanographic, and fishing activities. For example, successful tracking and harvesting of lobsters requires knowledge of temperatures, salinity, and other parameters as a function of depth, and mapping of these parameters can provide valuable predictive information for fishermen. There are known technologies to remotely monitor and report temperature in the open sea. For example, fixed buoys can be anchored in certain positions in the sea and continuously measure and report temperature at a certain depth corresponding to the immersion depth of the temperature monitoring device attached to the a fixed buoy. On the other hand, drifting buoys can be released in a body of water and move with the currents over a period of days, weeks, or months, with on-board electronics typically transmitting a radio signal that is detected by a satellite network, giving sensor data and location of the buoy.

These known techniques only enable measurement of the temperature at a fixed depth. In order to measure temperature at different depths and over range of time, a manual measurement typically involving an operator and ship present at the location are needed, whereby a temperature sensing device is immersed in the ocean and measurements are performed as a function of the immersion depth. This procedure is expensive, time consuming, and not practical.

Dataloggers incorporating devices/sensors that are capable of measuring salinity, temperature, depth (pressure), and conductivity, and are designed as archival tags for analyzing fish migration, distribution, and feeding behavior, are also known in the art. The dataloggers can be attached to fish as tags or used as stand-alone monitors for sampling in the ocean. They can be also fastened to fishing gear as temperature and pressure monitors. The disadvantage of these devices is difficulty of retrieving and timely reporting the information collected by fish-attached tags or by stand-alone monitors. As a result the information is not being collected at a scale it is needed, and there are significant delays in analyzing the information and providing such information to fishing industry. Wireless transmission of data from undersea autonomous dataloggers is impossible due to high depth and consequent attenuation of the signal. The transmission of the data is only practical once an autonomous probe or a datalogger is on the sea surface. However activating the transmission requires extensive device handling, such as retrieval of the device, cleaning, connection to data collection ports, etc., which may require a dedicated operator which is impractical on a ship. Some currently known sea-bottom sensors must be disconnected from fishing gear or trap, cleaned to expose the infra-red (IR) port, inserted into a reader connected to a PC and then reattached to the fishing gear or trap. Depth and position must be recorded separately and can confound the temperature data if records are inaccurate or incomplete. These procedures, when performed on a fishing vessel by working fishermen and on multiple probes, are complicated and not practical.

Devices that attempt to continuously wirelessly transmit the data will suffer from very quick depletion of the undersea probe power supply and hence require either battery replacement, re-charge, or installation of a new probe, which is expensive and impractical. As a result, the data collected using existing devices is uploaded only infrequently and is not available in real time.

There is a need for fully automated collection and reporting of undersea environmental parameters as a function of depth, time, and location using low cost, easy to use, autonomously powered devices.

BRIEF DESCRIPTION

An embodiment of the present invention provides for remote monitoring and reporting of the temperature and other environmental parameters as a function of time and depth, without operator intervention. Briefly, the monitoring device according to an embodiment of the present invention comprises at least one environmental parameter sensor, such as, for example, temperature, salinity, or pH sensor, a depth sensor which detects the depth of the device immersion by measuring hydrostatic pressure, a data logging system which records the data as a function of time, a communication system adapted to transmit data to data collection station, with data collection station adapted to transmit data collected from a plurality of devices to data depository.

More specifically, an undersea logging device comprises a pressure sensor and at least one environmental parameter sensor, such as temperature sensor. The data measured by the sensors is logged while the device is under water and is wirelessly transmitted once the device is aboard a ship. Transmitting of data is automatically triggered by the pressure sensor detecting that the logging device is out of the water and aboard the ship.

DETAILED DESCRIPTION

Device description.

Figure 1:
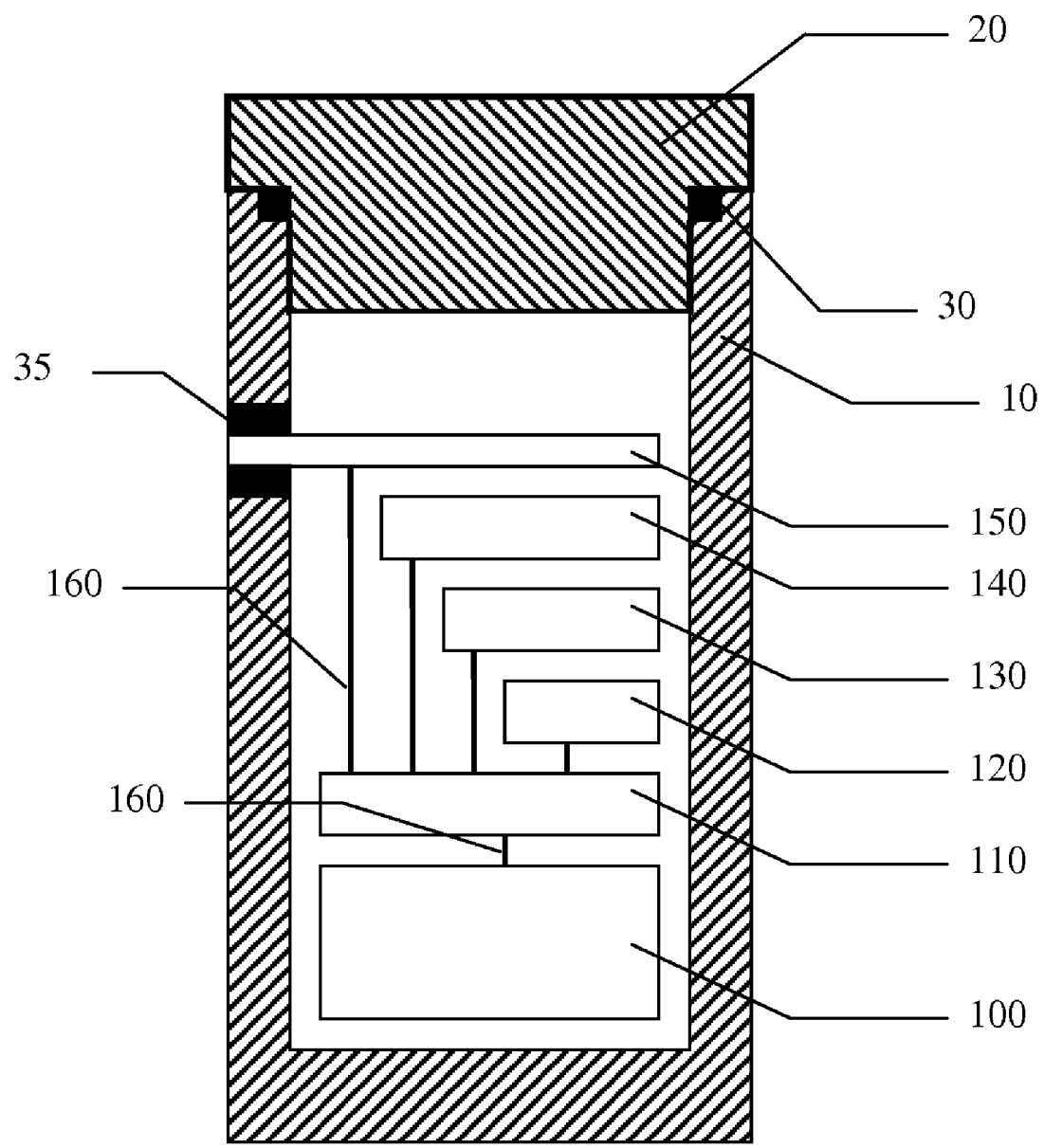
FIG. 1 shows schematic cross-sectional view of an embodiment of the present invention.

Referring to FIG. 1, a schematic cross-sectional view of an embodiment of the device of the present invention is shown. Device body 10 is a hollow container, preferably made of non-shielding, non-conductive material such as plastic or composite material capable of withstanding undersea conditions of high hydrostatic pressure and sea water for extended periods. Body 10 is capped or sealed with a cap 20 using a gasket or an epoxy seal 30 to provide for a hermetic seal capable of withstanding high hydrostatic pressure. Other known means of sealing or capping body 10 can be utilized, such as for example welding or gluing cap 20 to body 10. In one embodiment, device body 10 has enough flexibility to deform under high hydrostatic pressure so that the external pressure can be inferred from the pressure inside the cavity of device body 10. In another embodiment, device body 10 is not flexible, but in order to transmit the pressure there is provided a flexible membrane (not shown) attached to device body 10. In one embodiment of the present invention, device body 10 is further filled with an inert liquid to facilitate transmission of the external pressure from outside environment to the sensing elements disposed inside of device body 10. In yet another embodiment, device body 10 is not flexible, and the pressure measurement is performed by a pressure sensor penetrating device body 10 for a contact with outside undersea environment. In another embodiment of the present invention, device body 10 is made of metal, with an antenna (not shown) protruding from the device body to outside to facilitate wireless transmission.

Inside device body 10 are disposed a battery pack 100, an electronic circuit module 110, a wireless communications module 120, a temperature sensor 130, a pressure sensor 140, and optionally, at least one additional environmental sensor 150, which may include temperature, pressure, pH, salinity, or flow sensor, or another environmental parameter sensor. The sensors which are monitoring temperature are preferably disposed inside of device body 10. Other environmental parameters sensors can be disposed inside of device body 10, such as pressure sensor 140 shown in FIG. 1. In this embodiment outside pressure is transmitted to the sensor though substantially flexible walls of device body 10 or though a flexible membrane (not shown). An environmental parameter sensor 150 which needs to be in contact with the sea water in order to perform measurements, such as pH, salinity, flow, or another environmental sensor, protrudes through device body 10 or cap 20 and is sealed by compression gaskets 35, epoxy seal, welding, or other known means of hermetically sealing a feedthrough sensor. Sensor 150 is preferably mounted flush with device body 10 wall, as shown in FIG. 1. In another embodiment external sensor 150 is part of a flexible circuit with only its leads or pins extending through the seal 35 in the body 10 of the device.

Battery pack 100, electronic circuit module 110, wireless communications module 120, temperature sensor 130, pressure sensor 140, and additional environmental sensor or sensors 150 are interconnected by electric wiring 160. Electronic circuit 110 includes electronic components communicating with sensors and collecting data measured by sensors, as well as a memory component for logging data collected from sensors. Electronic circuit 110 also has processing capabilities for detecting changes in pressure values measured by pressure sensor 140 to determine when the device is at the sea level. Electronic circuit 110 is connected to wireless communications module 120 which includes an electronic circuit and transmission antenna. Wireless communications module 120 is capable of establishing contact using radio-frequency (RF) wireless transmission technology with data collecting device in the range of module transmission capability and to transmit logged data. There are a number of RF wireless transmission technologies known in the art and capable of establishing contact and transmitting data.

Figure 2:
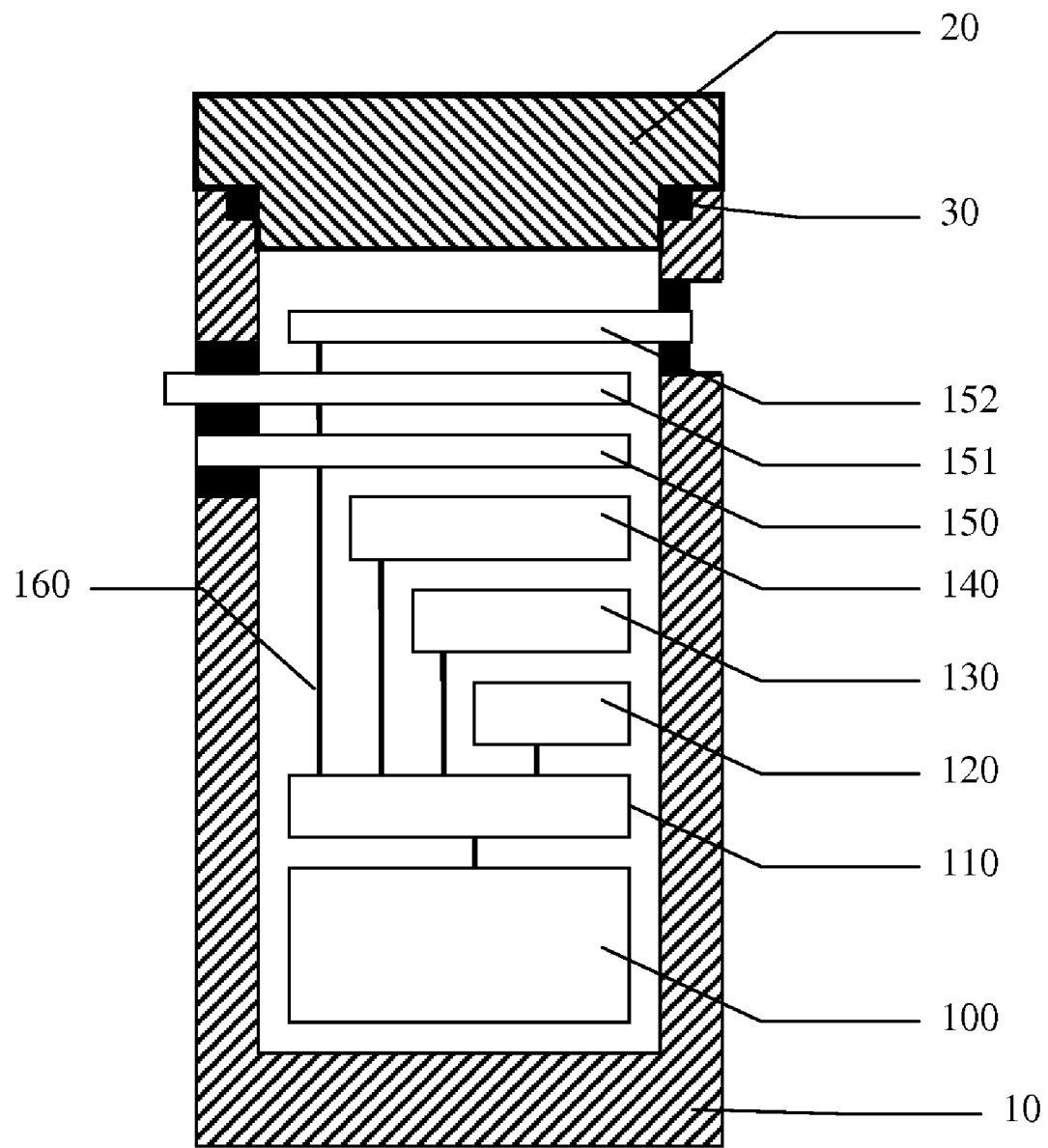
FIG. 2 shows schematic cross-sectional view of an embodiment of the present invention.

Referring now to FIG. 2, an embodiment of the present invention device is shown with three environmental parameters sensors 150, 151, and 152 in contact with sea water outside of the device. Different mounting arrangements are shown, with sensor 150 mounted flush with the device body 10, sensor 151 protruding from device body 10, and sensor 152 recessed into device body 10. Sensors 150, 151, and 152 may include, but are not limited to pH, salinity, and flow sensors.

The environmental parameters sensors that are utilized in an embodiment of the present invention are pH, salinity, conductivity, flow sensors, and other sensors which are available and known in the art or are being developed.

Device Operation

Figure 3:
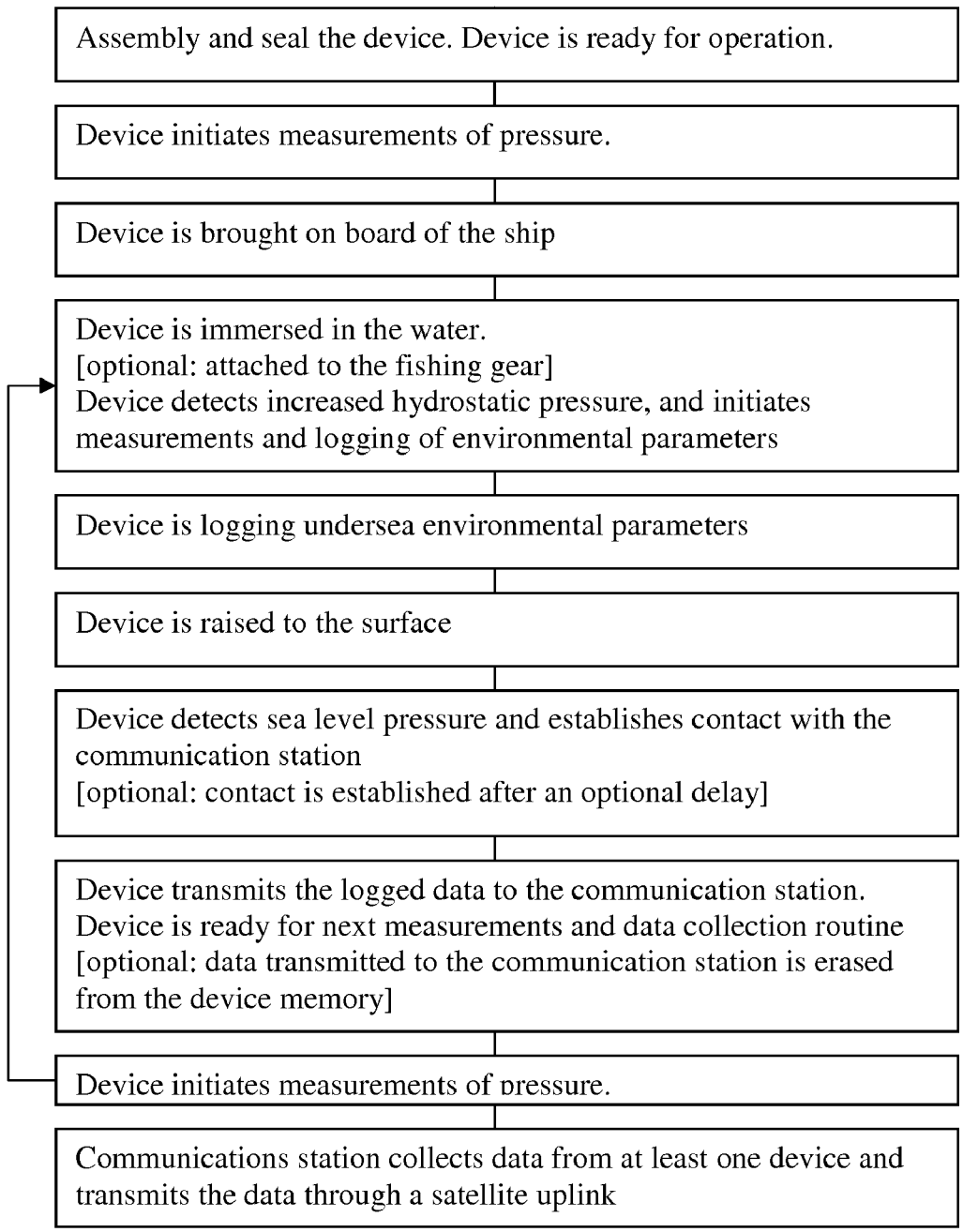
FIG. 3 shows flow chart diagram illustrating operation of the device according to an embodiment of the present invention.

Referring now to FIG. 3, the operation of the device, data logging, and transmission are illustrated. After the device has been assembled and sealed its communication function is tested and verified. Logic in the device prevents further communication until submersion and subsequent removal from water as determined by the pressure sensor. Once tested, the device periodically measures pressure to detect whether the device is immersed in the sea. In an embodiment of the device, while the device is detecting the sea level pressure, no environmental parameters are logged. In another embodiment of the device, the device performs continuous measurements and is logging all environmental parameters at any pressure.

The device is further brought aboard a ship and in an embodiment of the device attached to a fishing rig. Device is then immersed in the sea and detects increased hydrostatic pressure. Device then initiates measurements of environmental parameters and logging of data. The process of measuring and logging data continues while the device is under water, which can be for periods ranging from under an hour to several months.

After the device is raised to the surface, the device detects that the hydrostatic pressure has decreased to sea level pressure, which indicates that the device is being removed from water. The device then establishes a wireless contact with the data collection station and transmits logged data to the data collection station. In one embodiment, the wireless communications are established using radio frequency communication protocols known in the art, such as Bluetooth™ or Zigbee™ protocols, typically transmitting in the unlicensed band at 2.4 GHz, however other radio frequency and generally wireless communication protocols known in the art are possible. In one embodiment of present invention, an optional time delay between detecting sea level pressure and attempting to contact the data collection station is utilized, to allow time for the device to be brought aboard and placed closer to the communication station. The optional delay is from zero to 60 minutes, most preferably from zero to 15 minutes. Once the device has established wireless communication link with the data collection station, the device initiates wireless transmission of the logged data.

If the device was unable to establish the communications link with the data collection station, the device again attempts to establish the connection after optional delay, which is preferably from zero to 60 minutes, most preferably from 1 to 15 minutes.

In another embodiment of the device, the data collection station is periodically wirelessly querying for presence of the devices aboard of the ship within range of wireless communication. If and when a device or plurality of devices is detected within range, the data collection station establishes wireless contact and then prompts the device or devices to transmit the logged data.

After the data was transmitted, successfully transmitted data is optionally erased from the device memory. The device then continues performing pressure measurements. Once increased pressure is detected, indicating that the device is immersed and is underwater, the device again initiates full data logging of all environmental parameters.

The data collection station of an embodiment of the present invention can be a personal computer-based terminal equipped with wireless transmission and communication capabilities. In one embodiment, data collection station is also capable of using Global Positioning System (GPS) to establish the location of the ship. Additionally, the data collection station can be capable of uploading data through a satellite uplink or through an on-board internet connection, or through other communication means, to the central data depository where the data is then analyzed for preparing prognostic reports on undersea environmental conditions. Optionally, after the multiple sets of data from the device were wirelessly transferred to the data collection station, the station establishes communications link and communicates the data through a satellite uplink or through an on-board internet connection to the central data depository.

In another embodiment, the data collection station is a compact mobile handheld computer such as PocketPC. The data from the device is wirelessly transferred to PocketPC, wherein PocketPC collects and stores data sets throughout the sailing of the ship. The collected data is then transferred to the central data depository at a later time, optionally using a separate computer ashore, via an internet connection or via a satellite uplink.

Figure 5:
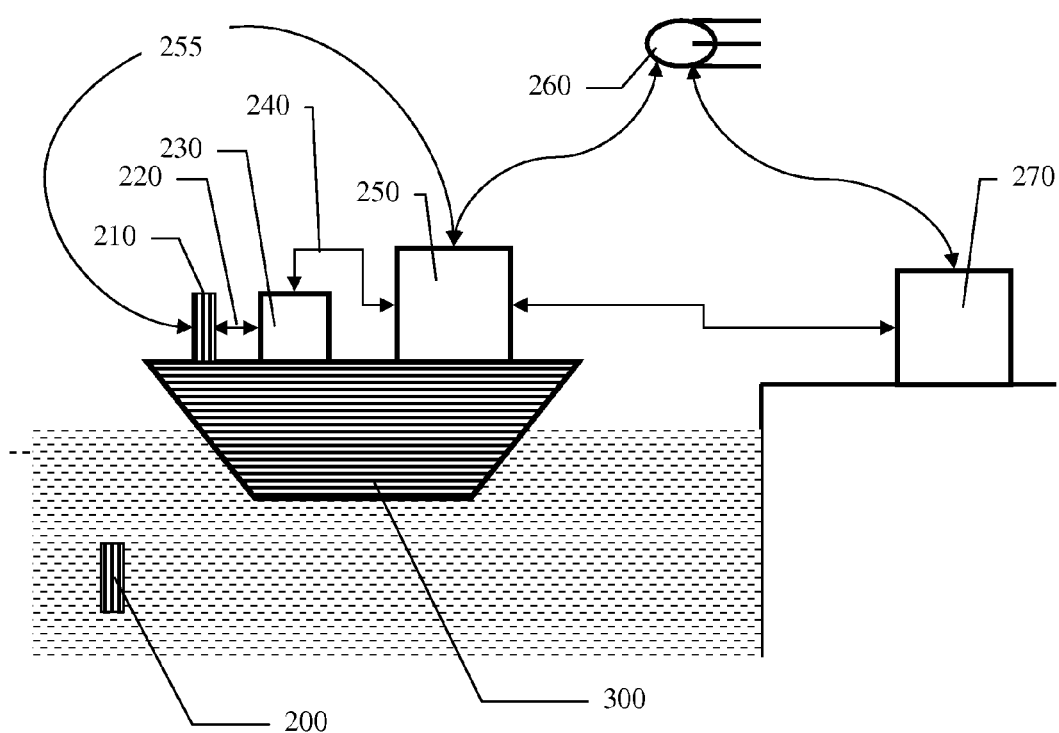
FIG. 5 shows schematic representation of data collection and transmission according to an embodiment of the present invention.

Referring now to FIG. 5, a schematic representation of data collection and transmission according to an embodiment of the present invention is shown. The device in an embodiment of the present invention is shown logging environmental data undersea and is referenced with numeral 200. After the undersea data logging phase, the device is also shown aboard the ship 300 and is referenced with numeral 210. Once aboard ship 300, device 210 establishes wireless RF connection 220 with PocketPC 230 and transmits logged data. PocketPC 230 can optionally be further linked to data collection station 250 through a connection link 240 and transmit data. The device 210 can also establish direct contact to data collection station 250 through a connection link 255. The data collection station 250 transmits the data through a satellite 260 uplink or via other wireless means, or via internet, to the central data depository 270.

EXAMPLE 1

A device was assembled and sealed in a plastic body. The device housing was tested in a pressure chamber and survived a sustained pressure of 800 PSI. The pressure was checked at fifteen minute intervals and temperatures recorded hourly. During the intervals between pressure or temperature measurements the device was in a low power "sleep mode". A PocketPC was utilized as data collection station. Data transfer was initiated when a pressure reading of <50 PSI was detected. When the remote PocketPC or data collection station was not within range to communicate, the data logging device attempted to reconnect at 15 minute intervals until successful or the device detected an external pressure of >50 PSI. The power budget of the device results in an expected life of about 5 years with a single C-cell and 15 minute sampling period and hourly data storage interval.

The wireless communications module used in the device transmitted data via Bluetooth™ (a radio frequency standard) to a PC or palm-top computer, however other radio frequency communication protocols known in the art, such as Zigbee™ protocols as well as other radio frequency and generally wireless communication protocols known in the art are possible. In a second experiment conducted on an off-shore lobster boat two hand-held PC IPAQ™ computers were able to communicate with the device from all positions on the boat even with all electronic equipment operating. In this instance the power management scheme demonstrated that automatic data transmission would occur only when the sensor was on deck. These devices used a standard pressure sensor directly exposed to the sea environment.

In yet another embodiment the device uses a solid state pressure sensor on a silicon chip, surface-mounted to the circuit card within the sensor's case to infer the external pressure. The case was designed to deform under hydrostatic pressure, producing a non-linear change in the internal pressure, with depth calculated using a look-up table. Every fifteen minutes the micro-processor wakes from its low-power sleep-state and samples the pressure. If this occurs on the hour, the temperature is also measured and the data are stored. If the pressure has been reduced to an indicated depth of less than 15 meters it is assumed that the sensor has been retrieved and is on deck—the device then attempts to communicate at five minute intervals until communication is established, six attempts have been unsuccessful, or the pressure is increased to indicate a depth of more than 15 meters. The operator, for example a lobsterman, needs to do nothing to retrieve the data since the sensor automatically sends all data to the computer, which can be located anywhere on board. Traps are simply pulled up, emptied, baited and replaced. Temperature and depth data can be accessed from the computer at any time in text or graphical form.

An operational life of at least five years using a single lithium-ion C-cell is expected from the device. The power budget estimates correspond to the sensor in its sleep mode about 98.7% of the time. A typical low-power processor, such as the PIC 18LF2320, consumes less than 15 µA in this state. Communications time is estimated at about 15 hours per year and data measurement is estimated at about 97 hours per year.

As an alternative to using an absolute pressure to initiate data transmission a 50% change in pressure from one sample to the next can be used. If the remote data collection station is not within range to communicate the data logging device will try repeatedly at 15 minute intervals. The interval between communication attempts, and the number of times that the device will try to establish communication, can be set by the user. Data transfer can also be initiated manually using a magnetic reed switch that is provided within the device by bringing a magnet in close proximity of the device to start data transmission as needed.

Additional advantages of embodiments of the present invention come from the automatic wireless data transfer. At no point is intervention required from the operator. If, for example, a device is attached to a lobster trap it can be set to begin to collect data within 15 minutes of submersion. When brought on deck the lobsterman removes the catch from the trap, baits it, and then redeploys it. As long as the sampling interval for pressure is set to a period shorter than the trap would be on deck data transmission will occur automatically. This sampling interval is programmable by the user.

Figure 4:
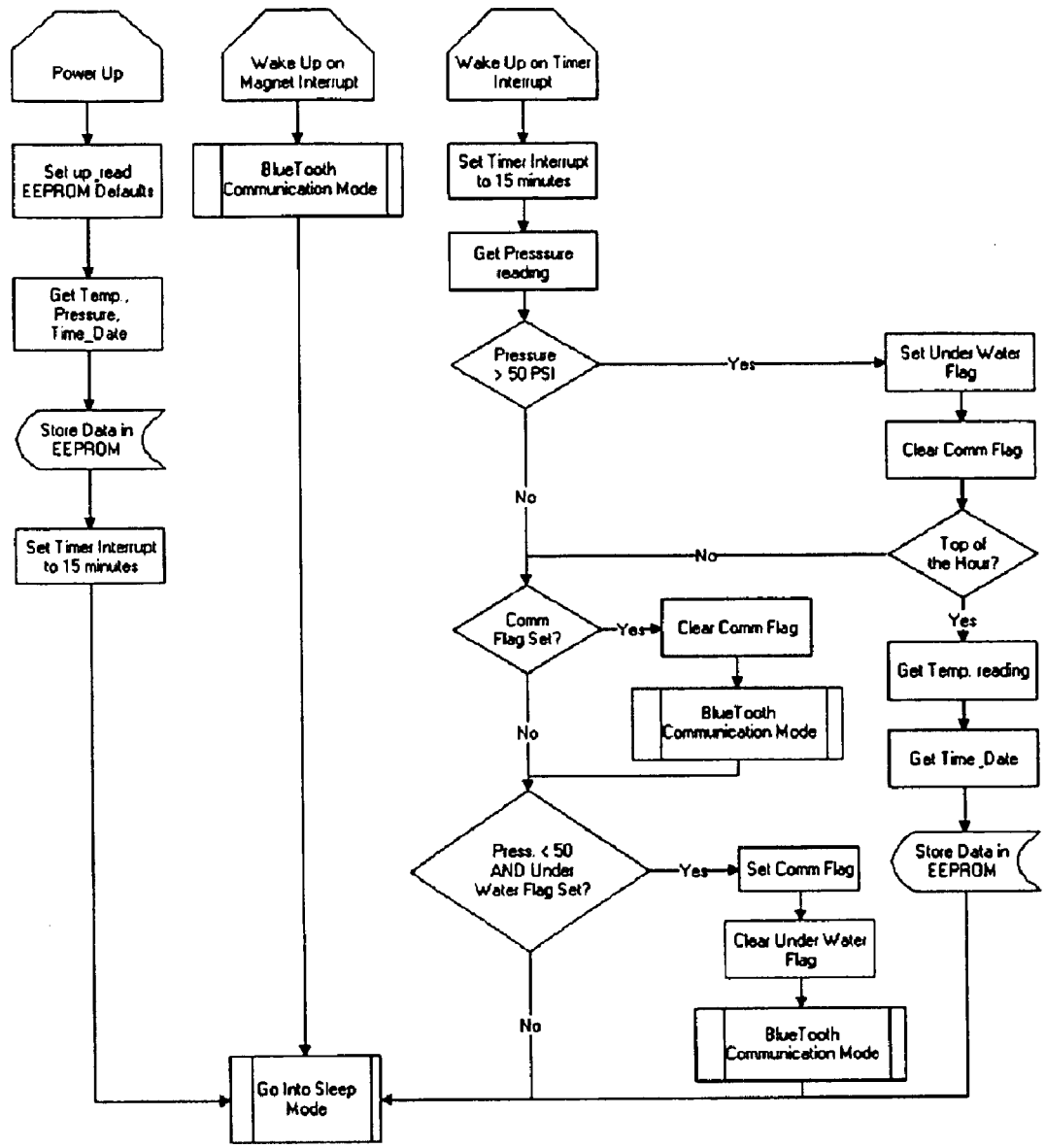
FIG. 4 shows flow chart diagram illustrating operation of the firmware inside the data-logging device according to an embodiment of the present invention.

A flow diagram of how the firmware inside the data-logging device is processed is shown in FIG. 4. The data is displayed on four different screens, including screen display of the past three temperatures logged in text format with a temperature vs. time/date graph; screen displaying past temperatures and pressures since the last download in text format; screen displaying temperature vs. time/date graph representing all data since the last download; and screen displaying a temperature vs. time/date graph representing all data in the last week or all history that has been retained on the SD memory card. The data is saved automatically onto the SD memory card in a text format, comma-delimited. Each data log includes hour, date, month, temp., pressure, etc. A typical text file will look like this:

Hour,Date,Month,Pressure,Temperature, 11,12,1,50,72, 12,12,1,51,71

13,12,1,52,72

The data above represents 11 am on January 12, Pressure=100 PSI (50×2), Temperature=72° F.

12 pm on January 12, Pressure=102 PSI (51×2), Temperature=71° F.

1 pm on January 12, Pressure=104 PSI (52×2), Temperature=72° F.

What is claimed is:

1. An undersea logging device comprising:
   at least one environmental parameter sensor,
   at least one pressure sensor,
   an electronic circuit adapted for logging data measured by said environmental parameter sensor and said pressure sensor, and
   a wireless transmitter of said data, wherein transmitting of said data is triggered by said pressure sensor detecting a preset value of pressure.

2. The undersea logging device according to claim 1, wherein said preset value of pressure is a sea level pressure.

3. The undersea logging device according to claim 1, said data comprising:
   values of time of measurement,
   values of pressure measured by said pressure sensor, and
   values at least one of said environmental parameter measured by at least one of said environmental parameter sensor.

4. The undersea logging device according to claim 1, wherein said wireless transmitter comprises a radio frequency transmitter.

5. The undersea logging device according to claim 1, wherein at least one of said environmental parameter is temperature, pressure, pH, conductivity, or salinity.

6. The undersea logging device according to claim 1, wherein transmitting of said data triggered by said pressure sensor detecting a preset value of pressure is initiated after a time delay.

7. The undersea logging device according to claim 6, wherein said time delay is from zero to 60 minutes.

8. The undersea logging device according to claim 1 further comprising:
   a computer means adapted for accepting wireless transmission and receiving said data from said wireless transmitter, said computer means having means for measuring a geographic location of said undersea logging device, wherein
   said computer means is adapted for collecting and transmitting said data to an end-user.

9. The undersea logging device according to claim 8, wherein said means for measuring said geographic location of said undersea logging device comprise a GPS device.

10. The undersea logging device according to claim 1, further comprising a magnetic switch that is provided within said undersea logging device wherein transmitting of said data is optionally triggered by actuating said magnetic switch.

11. An undersea logging device comprising:
    a means for measuring temperature,
    a means for measuring pressure,
    an electronic means for logging data, said data comprising values of temperature and pressure, and
    a means for wireless transmission of said data, wherein transmission of said data is triggered by said means for measuring pressure detecting a preset value of pressure.

12. The undersea logging device according to claim 11, wherein said preset value of pressure is a sea level pressure.

13. The undersea logging device according to claim 11, wherein said means for wireless transmission comprises a radio frequency transmitter.

14. The undersea logging device according to claim 11, wherein transmission of said data triggered by said means for measuring pressure detecting a preset value of pressure is initiated after a time delay.

15. The undersea logging device according to claim 14, wherein said time delay is from zero to 60 minutes.

16. The undersea logging device according to claim 11 further comprising:
    a computer means adapted for accepting wireless transmission and receiving said data from said means for wireless transmission, said computer means having means for measuring a geographic location of said undersea logging device, wherein
    said computer means is adapted for collecting and transmitting said data to an end-user.

17. The undersea logging device according to claim 16, wherein said means for measuring said geographic location of said undersea logging device comprise a GPS device.

18. The undersea logging device according to claim 11, further comprising a means for measuring an environmental parameter, wherein said environmental parameter is pH, salinity, conductivity, or combination thereof.

19. The undersea logging device according to claim 18, wherein said data further comprises values of said environmental parameter.

20. The undersea logging device according to claim 11, further comprising a means for triggering said undersea logging device,
    wherein transmitting of said data is optionally triggered by magnetically actuating said means for triggering.

* * * * *